Figure 1:
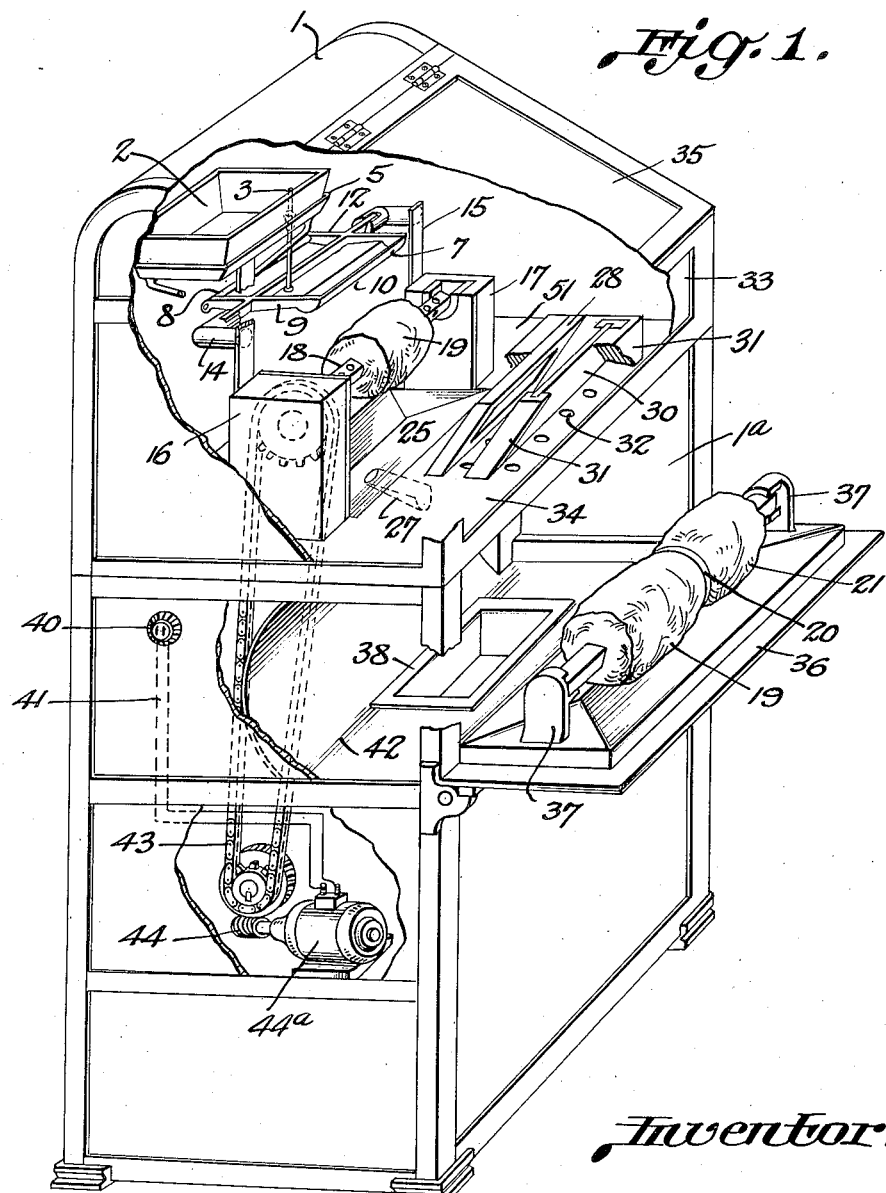

Nov. 3, 1936.  F. F. THOMPSON  2,059,666
BARBECUE MACHINE
Filed Dec. 5, 1932  2 Sheets-Sheet 1

Inventor:
Frederick Foster Thompson

Nov. 3, 1936.   F. F. THOMPSON   2,059,666
BARBECUE MACHINE
Filed Dec. 5, 1932   2 Sheets-Sheet 2

Inventor:
Frederick Foster Thompson

Patented Nov. 3, 1936

2,059,666

UNITED STATES PATENT OFFICE 2,059,666

BARBECUE MACHINE

Frederick Foster Thompson, Lawton, Okla.

Application December 5, 1932, Serial No. 645,872

3 Claims. (Cl. 53—5)

This invention relates to display barbecue machines.

An object of the invention is the provision of a barbecue machine for cooking and seasoning meats of various kinds in a uniform and sanitary manner, the machine providing an attractive display for the meats being cooked and the meats which have been cooked and stored in a heating oven.

Another object of the invention is the provision of a barbecue machine in which the meats are not only seasoned by materials uniformly distributed over the surface of the meat but materials which are carried by a spit so that the meat will be seasoned simultaneously from the exterior and interior during the baking operation.

A further object of the invention is the provision of a barbecue machine in which means are provided for uniformly distributing the seasoning liquid over the surface of the meat being cooked while automatically supplying the distributing means with the liquid from a storage tank enclosed in a sanitary manner from insects and foreign matter carried by the air.

A further object of the invention is the provision of a barbecue machine for supplying uniformly heat to meats being cooked while distributing a seasoning liquid over the surface of the meat, means also being provided to prevent the re-application of the seasoning liquid to the meats being cooked and to meats being retained in a heating oven.

Another object of the invention is the provision of a barbecue machine having a baking oven and a heating oven closely associated in which meats after they have been cooked may be stored in a heating oven and carried by the inner face of the door of the heating oven which may be employed as a carving table when it is desired to supply the cooked meat to customers.

This invention will be best understood from a consideration of the following detailed description, in view of the accompanying drawings forming a part of the specification, nevertheless, it is to be understood that the invention is not confined to the disclosure, being susceptible of such changes and modifications which shall define no material departure from the salient features of the invention as expressed in the appended claims.

Figure 2:
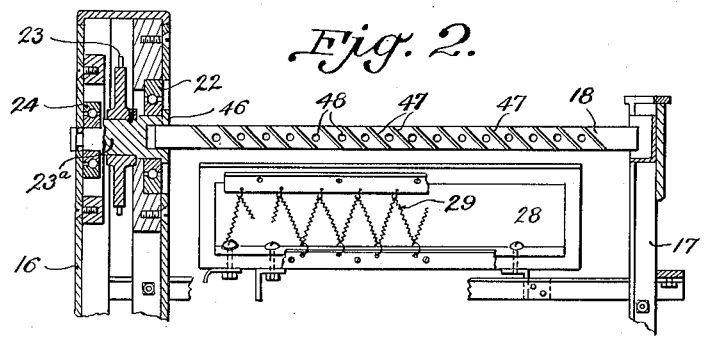
Figure 3:
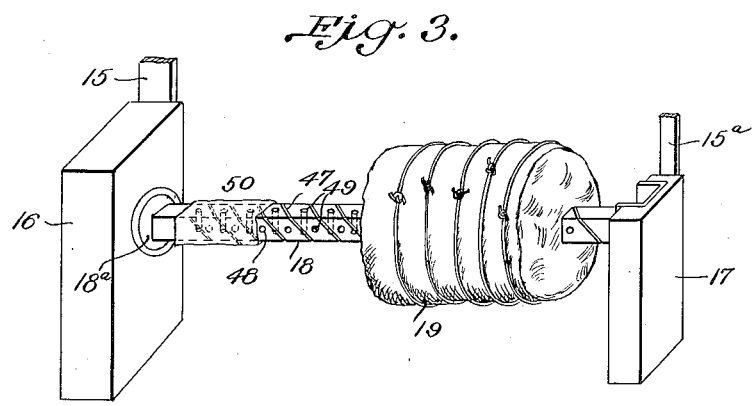

In the drawings:

Figure 1 is a view in perspective of the barbecue machine with parts removed showing the door of the heating oven in open position and providing a carving table, Figure 2 is a fragmentary vertical section of the heating oven showing the spit and heating element, Figure 3 is a fragmentary view in perspective of the means for supporting the meat to be baked and disclosing my improved spit.

Referring more particularly to Fig. 1 of the drawings, I designates a baking oven which is formed of a metal framework with the front wall, side walls and top formed of transparent material such as pyrex glass which will stand a sufficient temperature in the baking of the meat shown at 19 and supported by a mandrel or spit 18. A door 35 which includes a metal frame supporting a transparent panel is hinged to the top of the baking oven and inclined at an angle to the horizontal.

Located within the baking oven is a storage container (Fig. 1) 2 which also may be formed of refractory glass and is adapted to contain a seasoning liquid which is distributed, as will be presently explained, over the meat 19 which is being baked in the oven.

A distributing means in the form of a shallow pan 9 is located below the storage container 2 and above the meat 19 which is being cooked. The drip pan is carried by a support or frame 7 in the shape of a pan and this frame neatly receives the pan 9. Along one edge of the pan is provided a shallow groove 10 which is adapted to collect the seasoning liquid before the liquid is distributed through a plurality of perforations 11. The pan 10 is removable from the support 7 so that it may be readily cleaned when desired. This pan also contains a lug 10$^a$ upon which rests the lower end of the stem or metering pin 3.

A support or frame 7 is provided with side bars 12 from which laterally project trunnions 7$^a$ mounted in bearings 14 which are connected to the brackets 15 and 15$^a$ attached respectively to the posts 16 and 17. From an inspection of Figures 7 and 9 it will be seen that the bearings 14 are so constructed that the flat trunnions 7$^a$ will permit the support 7 to be tilted at a predetermined angle but will prevent the support from moving to a vertical position. In other words, this construction is such that the support will permit the pan 9 to be tilted at a slight angle to the horizontal so that the seasoning liquid, indicated at 9$^a$, will be moved by gravity into the distributing channel or trough 10 when the pan has been tilted sufficiently by a predetermined quantity of seasoning liquid which has been discharged from the storage container 2 to said distributing pan.

A weight 8 is carried by extensions or side bars 12 of the support 7 and will maintain the pan in the position shown in Figure 7 until a predetermined quantity of seasoning liquid has been received by the pan 9.

The meat 19 is carried by a spit or mandrel 18 which is passed through approximately the center of the meat to be cooked and has its ends supported in bearings 18ª in the posts 16 and 17.

A heating element 28 (Fig. 2) having electric wires 29 is adapted to be supported at an angle to the vertical and sufficiently inclined so that the heat rays from the heating element will be projected upon the meat 19 in the baking oven 1. This heating element may be secured to a floor 51 of the heating oven in any approved manner.

A reflector 30 is located adjacent the heating element 28 and inclined at substantially the same angle as the heating element and is carried by blocks 31 having grooves to receive the edges of the reflector. This reflector is spaced sufficiently from the heating element 28 to reflect the heat rays onto the meat 19. The portion 34 of the bottom 51 of the heating oven is provided with perforations 32 on both sides of the reflector 30 to permit the circulation of air between the baking oven 1 and the heating oven 1ª.

It will be noted from an inspection of Figs. 2 and 3 that the mandrel is provided with passages 48 and 49 extending entirely through the mandrel and these passages are adapted to be filled with seasoning material of any suitable material such as spices, pepper, salt, vinegar, ground vegetables, and fruits. The particular examples just given may be supplanted by other seasoning materials if desired.

The mandrel or spit is also provided with grooves 47 adapted to be supplied with seasoning materials of any well known type and over the whole mandrel is placed a coating of fat, as shown at 50. This coating not only provides a means for retaining the seasoning materials in the passages 48 and 49 and in the grooves 47 until the meat is sufficiently heated to melt the fat but the fat itself provides seasoning material for the meats. By this particular construction the meats when revolved and heated in the baking oven will be supplied with seasoning materials from the center while the seasoning materials are supplied by the distributing means 9 as previously described. It will be appreciated that as the meat is revolved the juices of the meat will be thrown outwardly towards the surface and the seasoning materials will be carried along with the juices of the meat.

Referring more particularly to Figs. 1 and 2 it will be seen that the post 16 is hollow and contains a sprocket wheel 23 driven by a chain 43 and this chain is driven by a gear 44 connected with an electric motor 44ª. The sprocket wheel 23 is secured to a stub shaft 23ª which is carried by bearings 22 and 24 supported by the post 16. This stub shaft has a socket 46 adapted to receive one end of the mandrel 18. The socket is the same cross sectional area as the mandrel 18 so that the end of the mandrel will neatly fit in the socket and be revolved when the stub shaft is revolved.

Wires 41 connect the motor with a switch 40 and this switch is in turn connected with a socket 49 and this socket is adapted to be connected in the usual manner to the house current.

The heating oven (Fig. 1) has an opening at the rear which is closed by a door 36 and this door is provided with posts 37 having sockets 37ª to receive the ends of the spit or mandrel 18 for supporting the meat in a horizontal position within the heating oven 1ª, for maintaining the meat at a predetermined temperature and for supporting the meat in a horizontal position when the door is open, as shown in Fig. 1 and in this position of the door the same is used as a carving table for supplying customers with meat.

As shown more particularly in Fig. 1, a number of pieces of meat may be placed on the spit or mandrel 18 and these pieces of meat may be of various kinds. The inner ends of the meat are separated by a disc 20.

A receptacle or pan 25 is received within an opening in the floor 51 of the baking oven and is located directly below the meat 19 so that as the seasoning liquid is distributed on the meat and drains off it will be collected by the pan 25 and be discharged through a spout 27 upon the meat supported by the spit or mandrel in the heating oven. If it is not desired, however, to supply the meat in the heating oven with the seasoning fluid, the spout 27 may be so positioned that it will drain directly into the pan 38 carried by the floor 42 of the heating oven. The pans 25 and 38 are removable so that they may be cleaned when desired. The pan 38 is located directly beneath the spout 27 in order to collect the seasoning liquid discharge from the spout.

The operation of my device is as follows: Meat which is to be cooked is placed upon the spit 18 which may be formed of a strip of wood of reduced cross sectional area and this spit is placed in the supporting bearings, as shown in Fig. 2. The seasoning fluid is placed in the storage container 2 and the door 35 is closed. Current is then turned on to the heating element 28 by manipulation of suitable switches, not shown. The motor 44ª is set in motion so that the spit 18 and the meat 19 are revolved in the baking oven 1.

When the meat has become sufficiently heated so that the temperature of the meat adjacent the spit 18 will be raised sufficiently to melt the fatty covering 50, the seasoning material in the grooves 47 and passages 48 and 49 will begin to affect the interior of the meat and as the meat is revolved and the juices from the interior carried outwardly the melted fat and the seasoning material will be carried along through the meat. Thus it will be seen that the meat is not only seasoned from the exterior but will be seasoned from the interior.

The seasoning material which has been distributed upon the exterior of the meat 19 will drop downwardly and be collected in the container 25 and spout 27 will carry the seasoning material over the meat stored in the heating oven and will aid in maintaining the meat in the proper state. The container 38 will be sufficiently large to collect all of the seasoning material which has drained from the various pieces of meat which are being cooked.

I claim:

1. In a barbecue machine, a spit adapted to be inserted centrally of the meat to be baked, said spit being provided with a plurality of spaced transversely disposed means for storing and distributing seasoning materials to the interior of the meat, only those storage and distributing means which are supplied with seasoning materials being confined wholly within the meat being cooked, each one of the plurality of means being independent of the other.

2. In a barbecue machine, a spit adapted to be inserted centrally of the meat to be baked, said spit being provided with transverse passage for storing and distributing seasoning materials to the interior of the meat, said passages being isolated from each other, the seasoning materials being released from the opposite ends of the passages to the interior of the meat when said meat is sufficiently heated.

3. In a barbecue machine, a spit provided with diametrically disposed passages extending through said spit, said passage adapted to be supplied with seasoning materials for distributing the seasoning materials to the interior of the meat, alternate passages being disposed at right angles to the other passages.

FREDERICK FOSTER THOMPSON.